United States Patent
Iida et al.

(10) Patent No.: US 10,450,900 B2
(45) Date of Patent: Oct. 22, 2019

(54) PLANT CONTROL APPARATUS, PLANT CONTROL METHOD AND POWER GENERATING PLANT

(71) Applicant: Kabushiki Kaisha Toshiba, Minato-ku (JP)

(72) Inventors: Takayuki Iida, Kawasaki (JP); Masayuki Tobo, Kawasaki (JP); Toyohiro Akebi, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 260 days.

(21) Appl. No.: 15/375,776

(22) Filed: Dec. 12, 2016

(65) Prior Publication Data

US 2017/0183980 A1    Jun. 29, 2017

(30) Foreign Application Priority Data

Dec. 24, 2015  (JP) ................................ 2015-251553

(51) Int. Cl.
| | |
|---|---|
| *F02C 9/28* | (2006.01) |
| *F01K 13/02* | (2006.01) |
| *F01K 23/10* | (2006.01) |
| *F01K 7/16* | (2006.01) |
| *F02C 6/18* | (2006.01) |

(52) U.S. Cl.
CPC ............ *F01K 23/101* (2013.01); *F01K 7/165* (2013.01); *F01K 13/02* (2013.01); *F02C 6/18* (2013.01);
(Continued)

(58) Field of Classification Search
CPC ........ F01K 13/02; F01K 13/025; F01K 23/06; F01K 23/10; F01K 23/101; F02C 7/26;
(Continued)

(56) References Cited

U.S. PATENT DOCUMENTS

| | | | | |
|---|---|---|---|---|
| 4,208,882 A | * | 6/1980 | Lopes ..................... | F01D 19/02 122/479.1 |
| 4,393,649 A | * | 7/1983 | Cheng ................... | F01K 21/047 60/39.55 |

(Continued)

FOREIGN PATENT DOCUMENTS

| | | |
|---|---|---|
| JP | H09-105503 A | 4/1997 |
| JP | 2000-130108 A | 5/2000 |

(Continued)

*Primary Examiner* — Steven M Sutherland
*Assistant Examiner* — Rene D Ford
(74) *Attorney, Agent, or Firm* — Oblon, McClelland, Maier & Neustadt, L.L.P.

(57) ABSTRACT

In one embodiment, a plant control apparatus is configured to control a power generating plant that includes a gas turbine configured to be driven by a gas, an exhaust heat recovery boiler configured to generate steam by using heat of an exhaust gas from the gas turbine, a temperature reducing apparatus configured to cool, through a cooling medium, the steam generated by the exhaust heat recovery boiler, and a steam turbine configured to be driven by the steam cooled by the temperature reducing apparatus. The plant control apparatus includes an output controller configured to control output of the gas turbine, and a temperature reduction controller configured to control a cooling operation of the steam by the temperature reducing apparatus while the output controller controls the output of the gas turbine.

10 Claims, 8 Drawing Sheets

(52) U.S. Cl.
CPC ............ *F02C 9/28* (2013.01); *F05D 2220/32* (2013.01); *F05D 2220/72* (2013.01); *F05D 2270/112* (2013.01); *F05D 2270/3032* (2013.01); *Y02E 20/16* (2013.01)

(58) Field of Classification Search
CPC ................ F02C 9/28; F05D 2270/112; F05D 2270/303; F05D 2270/3032; F22G 5/12
See application file for complete search history.

(56) References Cited

U.S. PATENT DOCUMENTS

| | | | | |
|---|---|---|---|---|
| 4,578,944 A | * | 4/1986 | Martens | ................ F01K 23/105 122/7 B |
| 4,589,255 A | * | 5/1986 | Martens | ................ F01D 17/085 60/646 |
| 4,638,630 A | * | 1/1987 | Martens | .................. F01D 21/12 60/39.182 |
| 2015/0176437 A1 | | 6/2015 | Tobo et al. | |
| 2015/0345387 A1 | | 12/2015 | Tobo et al. | |

FOREIGN PATENT DOCUMENTS

| | | |
|---|---|---|
| JP | 2002-21509 A | 1/2002 |
| JP | 2010-151345 A | 7/2010 |
| JP | 2015-143517 A | 8/2015 |
| JP | 2015-227630 A | 12/2015 |
| KR | 10-2015-0138051 A | 12/2015 |

* cited by examiner

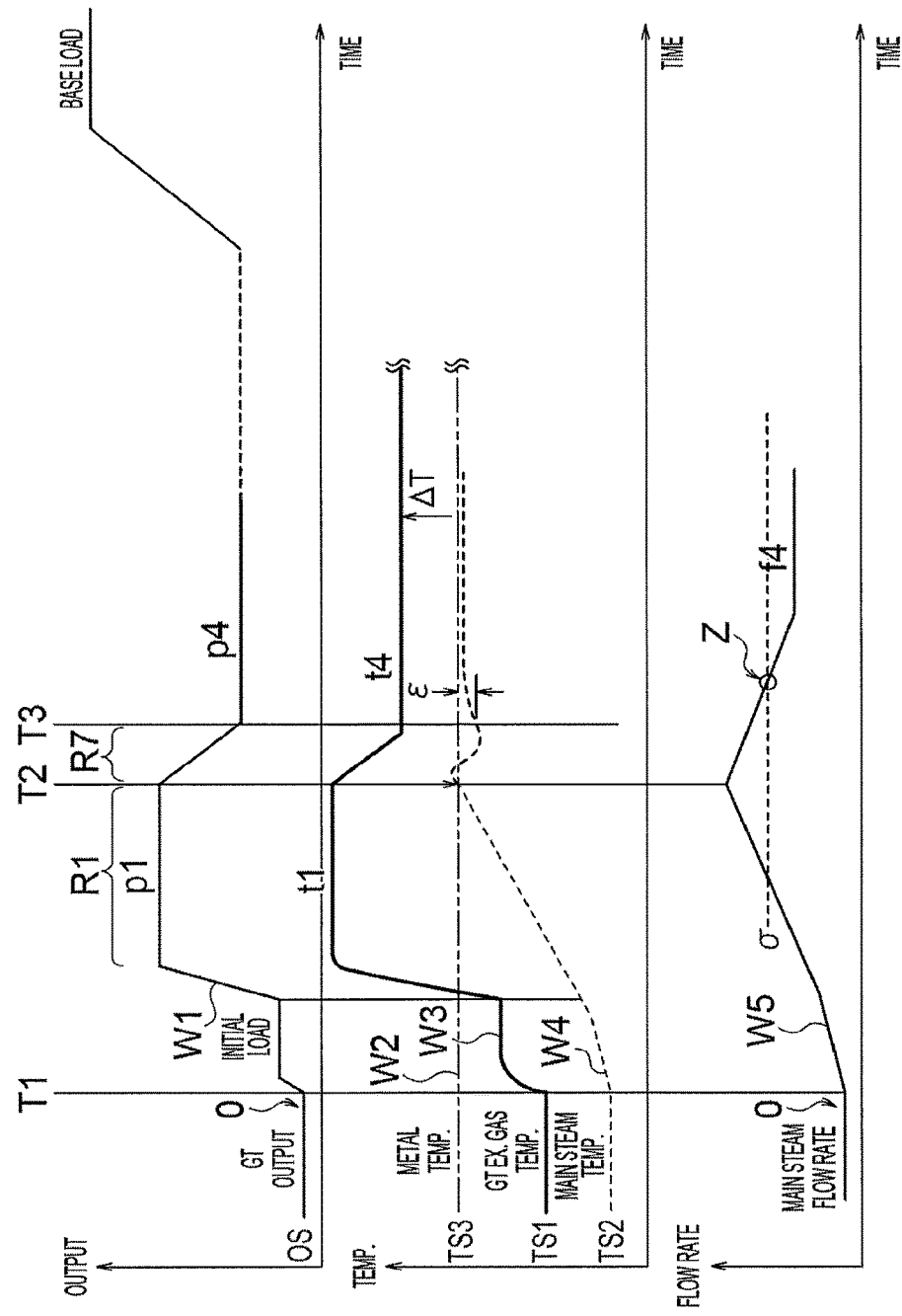

PLANT CONTROL APPARATUS, PLANT CONTROL METHOD AND POWER GENERATING PLANT

CROSS REFERENCE TO RELATED APPLICATION

This application is based upon and claims the benefit of priority from the prior Japanese Patent Applications No. 2015-251553, filed on Dec. 24, 2015, the entire contents of which are incorporated herein by reference.

FIELD

Embodiments described herein relate to a plant control apparatus, a plant control method and a power generating plant.

BACKGROUND

A combined-cycle power generating plant generally includes a gas turbine, an exhaust heat recovery boiler and a steam turbine. The gas turbine is driven by a gas supplied from a combustor. The exhaust heat recovery boiler generates steam by using heat of an exhaust gas discharged from the gas turbine. The steam turbine is driven by the steam supplied from the exhaust heat recovery boiler.

BRIEF DESCRIPTION OF THE DRAWINGS

FIG. 9 is a graph for describing the plant control method of the comparative example of the first embodiment.

DETAILED DESCRIPTION

Figure 1:
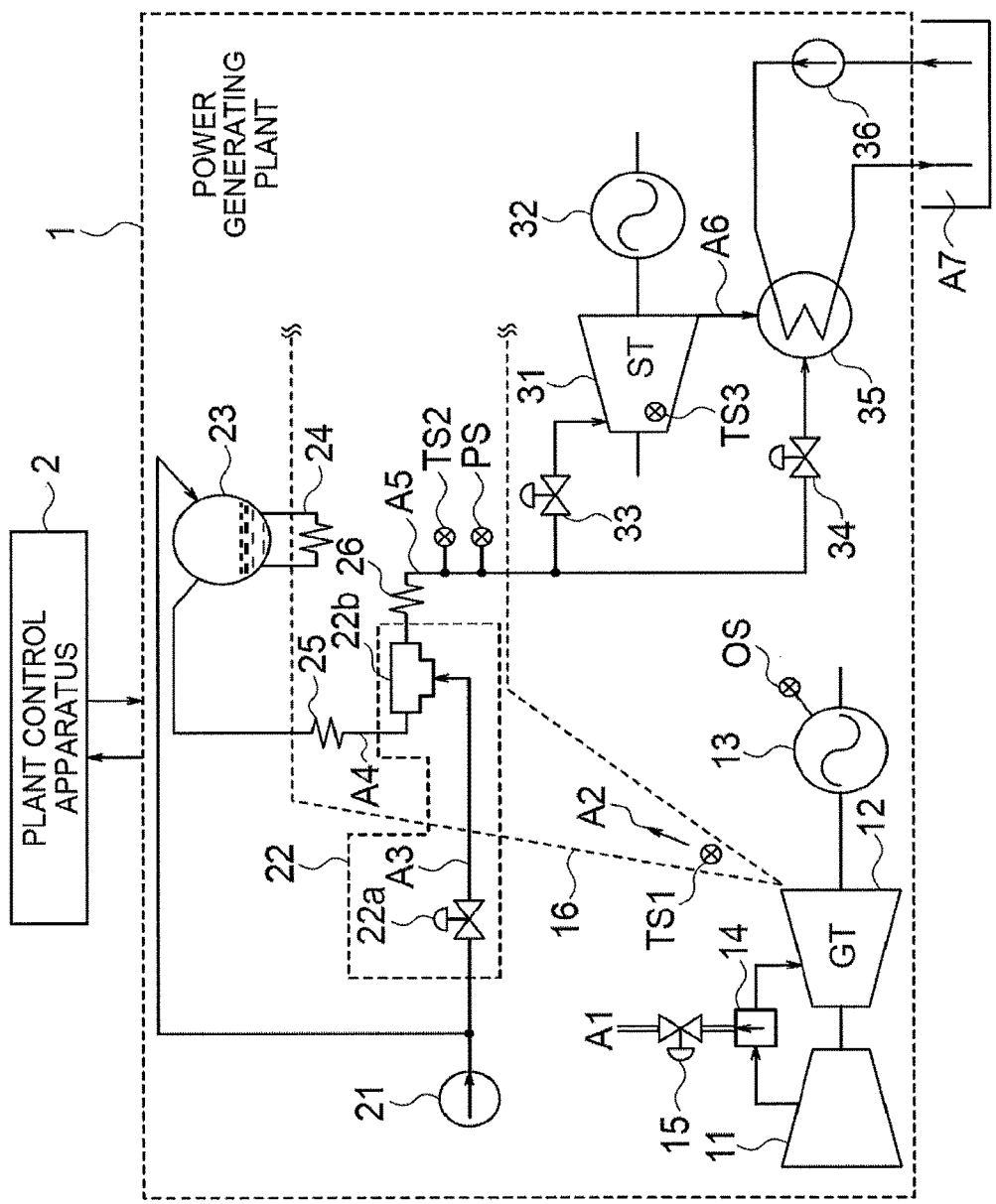
FIG. 1 is a schematic diagram illustrating a configuration of a power generating plant of a first embodiment.

Embodiments will now be explained with reference to the accompanying drawings.

For example, the combined-cycle power generating plant is activated as described below. First, the exhaust heat recovery boiler is operated while a gas turbine output is maintained at a second output value that is a larger value, so as to fast increase a main steam temperature. Next, when the main steam temperature has increased to a temperature suitable for the activation of the steam turbine, the gas turbine output is switched to a first output value that is a smaller value. This can achieve a shortened time to activate the power generating plant.

The first output value is an output value for adjusting the temperature of the exhaust gas to a predetermined temperature based on a metal temperature at a first-stage inner surface of the steam turbine. When the gas turbine output is continuously maintained at the second output value, the main steam temperature largely exceeds the metal temperature at the first-stage inner surface. Such a main steam temperature is not suitable for the activation of the steam turbine. Thus, the gas turbine output is switched from the second output value to the first output value. Accordingly, the exhaust gas temperature decreases, and a main steam temperature suitable for the activation of the steam turbine is obtained.

However, when the gas turbine output is reduced from the second output value to the first output value, the amount of heat held by the exhaust gas decreases. As a result, the amount of steam generated by the exhaust heat recovery boiler per unit time decreases, which leads to a reduced main steam flow rate. This reduction of the main steam flow rate causes problems in the following cases.

(1) The combined-cycle power generating plant is categorized into a biaxial type in which the gas turbine and the steam turbine are provided on different axes, and a uniaxial type in which the gas turbine and the steam turbine are provided on an identical axis. In the biaxial type, the steam turbine needs to perform a rated rotational operation (full-speed-no-load (FSNL) operation) through self-activation. A relatively large main steam flow rate needs to be achieved to perform the FSNL operation. The biaxial type has a 1-1-1 configuration including a single gas turbine, a single exhaust heat recovery boiler, and a single steam turbine, or an N-N-1 configuration including a plurality of gas turbines, a plurality of exhaust heat recovery boilers, and a single steam turbine (N is an integer equal to or larger than two).

(2) Before the activation of the combined-cycle power generating plant, the power generating plant has been stopped for a long time, and the metal temperature at the first-stage inner surface of the steam turbine is cooled down to a low temperature. Thus, the steam turbine needs to be activated with the main steam at low temperature, and thus needs exhaust gas at low temperature. This leads to reduction in the first output value and in the main steam flow rate.

Thus, when the gas turbine output is reduced from the second output value to the first output value, the main steam flow rate for driving the steam turbine is insufficient in the biaxial power generating plant. When this steam insufficiency is generated before ventilation of the steam turbine is started, the steam turbine cannot be activated. On the other hand, when the steam insufficiency is generated after the ventilation of the steam turbine is started, the operational state of the steam turbine, which has been in a speed increasing state for the FSNL operation, becomes a speed decreasing state.

In one embodiment, a plant control apparatus is configured to control a power generating plant that includes a gas turbine configured to be driven by a gas, an exhaust heat recovery boiler configured to generate steam by using heat of an exhaust gas from the gas turbine, a temperature reducing apparatus configured to cool, through a cooling medium, the steam generated by the exhaust heat recovery boiler, and a steam turbine configured to be driven by the steam cooled by the temperature reducing apparatus. The plant control apparatus includes an output controller configured to control output of the gas turbine, and a temperature reduction controller configured to control a cooling operation of the steam by the temperature reducing apparatus while the output controller controls the output of the gas turbine.

(First Embodiment)

FIG. 1 is a schematic diagram illustrating a configuration of a power generating plant 1 of a first embodiment. The power generating plant 1 of the present embodiment includes a plant control apparatus 2 that controls the power generating plant 1. The power generating plant 1 of the present embodiment is a combined-cycle power generating plant.

The power generating plant 1 of the present embodiment further includes a compressor 11, a gas turbine 12, a gas turbine (GT) generator 13, a combustor 14, a fuel control valve 15, an exhaust heat recovery boiler 16, a water supply pump 21, a temperature reducing apparatus 22, a drum 23, an evaporator 24, a primary superheater 25, a secondary superheater 26, a steam turbine 31, a steam turbine (ST) generator 32, a regulator valve 33, a bypass control valve 34, a steam condenser 35 and a circulating water pump 36. The temperature reducing apparatus 22 includes a temperature reduction control valve 22a and a temperature reducer 22b. The power generating plant 1 of the present embodiment further includes an output sensor OS, temperature sensors TS1, TS2 and TS3, and a pressure sensor PS.

The fuel control valve 15 is provided to a fuel pipe. When the fuel control valve 15 is opened, fuel A1 is supplied from the fuel pipe to the combustor 14. The compressor 11 supplies compression air to the combustor 14. The combustor 14 combusts the fuel A1 together with the compression air to generate a gas at high temperature and high pressure. The gas turbine 12 is rotated by this gas. The GT generator 13 generates power using this rotation. The output sensor OS detects output of the gas turbine 12 and outputs a result of the detection of the output to the plant control apparatus 2. The output of the gas turbine 12 is electricity output of the GT generator 13 connected with the gas turbine 12. The output sensor OS is provided to the GT generator 13.

An exhaust gas A2 discharged from the gas turbine 12 is transferred to the exhaust heat recovery boiler 16. The exhaust heat recovery boiler 16 generates steam using heat of the exhaust gas A2 as described later. The temperature sensor TS1 detects the temperature of the exhaust gas A2 near an exhaust gas inlet of the exhaust heat recovery boiler 16 and outputs a result of the temperature detection to the plant control apparatus 2.

The water supply pump 21 transfers water to a water supply pipe. The water supply pipe bifurcates into first and second pipes. The first pipe is connected with the temperature reducer 22b of the temperature reducing apparatus 22, and the second pipe is connected with the drum 23. The temperature reduction control valve 22a of the temperature reducing apparatus 22 is provided to the first pipe. When the temperature reduction control valve 22a is opened, water in the first pipe is supplied to the temperature reducer 22b as cooling water A3. The cooling water A3 is an example of a cooling medium. The temperature reducer 22b cools, through the cooling water A3, steam generated by the exhaust heat recovery boiler 16 As described later.

The evaporator 24, the primary superheater 25, the temperature reducer 22b, and the secondary superheater 26 are provided inside the exhaust heat recovery boiler 16, and serves as part of the exhaust heat recovery boiler 16. Water in the drum 23 is transferred to the evaporator 24 and becomes saturated steam by being heated through the exhaust gas A2 in the evaporator 24. The saturated steam becomes primary superheated steam A4 by being superheated through the exhaust gas A2 in the primary superheater 25. The primary superheated steam A4 becomes secondary superheated steam A5 by being cooled through the cooling water A3 in the temperature reducer 22b and then being superheated through the exhaust gas A2 in the secondary superheater 26.

The temperature reducer 22b mixes the cooling water A3 and the primary superheated steam A4. As a result, the cooling water A3 evaporates, and the primary superheated steam A4 is cooled by latent heat of the cooling water A3. Part of the cooling water A3 does not evaporate and is discharged from the temperature reducer 22b as water droplets. The secondary superheater 26 changes these water droplets into steam by superheating.

Hereinafter, the secondary superheated steam A5 is referred to as a main steam. The temperature sensor TS2 detects the temperature of the main steam A5 near a steam outlet of the exhaust heat recovery boiler 16, and outputs a result of the temperature detection to the plant control apparatus 2. The pressure sensor PS detects the pressure of the main steam A5 near the steam outlet of the exhaust heat recovery boiler 16, and outputs a result of the pressure detection to the plant control apparatus 2.

The main steam A5 generated by the exhaust heat recovery boiler 16 is discharged to a steam pipe. The steam pipe bifurcates into a main pipe and a bypass pipe. The main pipe is connected with the steam turbine 31, and the bypass pipe is connected with the steam condenser 35. The regulator valve 33 is provided to the main pipe. The bypass control valve 34 is provided to the bypass pipe.

When the regulator valve 33 is opened, the main steam A5 in the main pipe is supplied to the steam turbine 31. The steam turbine 31 is rotated by the main steam A5. The ST generator 32 generates power using this rotation. Main steam A6 discharged from the steam turbine 31 is transferred to the steam condenser 35. When the bypass control valve 34 is opened, the main steam A5 in the bypass pipe is transferred to the steam condenser 35 while bypassing the steam turbine 31. The temperature sensor TS3 detects a metal temperature at a first-stage inner surface of the steam turbine 31, and outputs a result of the temperature detection to the plant control apparatus 2.

The circulating water pump 36 supplies circulating water A7 to the steam condenser 35. The circulating water A7 is, for example, seawater. The steam condenser 35 cools the main steam A5 and A6 through the circulating water A7 and condenses the main steam A5 and A6 into water. When the circulating water A7 is seawater, the circulating water A7 discharged from the steam condenser 35 is returned back to sea.

[Temperature Reducing Apparatus 22]

As described above, the steam turbine 31 is driven by steam cooled by the temperature reducing apparatus 22. More specifically, the steam turbine 31 is driven by steam generated by the evaporator 24, superheated by the primary superheater 25, cooled by the temperature reducer 22b, and superheated by the secondary superheater 26. The following describes background of installation of the temperature reducing apparatus 22 at the power generating plant 1.

When the power generating plant 1 is activated, the output of the gas turbine 12 reaches a maximum output (base load) from an initial load through an intermediate output range. Typically, the temperature of the exhaust gas A2 in the intermediate output range is higher than the temperature of the exhaust gas A2 when the gas turbine 12 is operated at the maximum output. Thus, the temperature of the main steam A5 in the intermediate output range is tends to be higher than the temperature of the main steam A5 when the gas turbine 12 is operated at the maximum output. For this reason, the temperature reducing apparatus 22 is installed to cool the primary superheated steam A4 in the intermediate output range.

When the temperature reducing apparatus 22 is not installed at the power generating plant 1, the exhaust heat recovery boiler 16 needs to be manufactured from expensive material resistant to high temperature steam in the intermediate output range. This is not advantageous in economic efficiency. The intermediate output range is a transient pass band at a plant activation process, and the cost increase of the exhaust heat recovery boiler 16 for this transient pass band is not preferable when it is taken into consideration that the plant is operated at or near the maximum output almost all the time when commercially operated.

Accordingly, the temperature reducing apparatus 22 is installed at the power generating plant 1 of the present embodiment. This is because, when the primary superheated steam A4 is cooled by the temperature reducing apparatus 22 in the intermediate output range, cost reduction of the exhaust heat recovery boiler 16 can be achieved despite decrease in heat efficiency.

The temperature reducing apparatus 22 of the present embodiment increases the flow rate of the cooling water A3 when the temperature and the flow rate of the primary superheated steam A4 increase, and reduces the flow rate of the cooling water A3 when the temperature and the flow rate of the primary superheated steam A4 decrease. This maintains the temperature of the main steam A5 constant.

Figure 2:
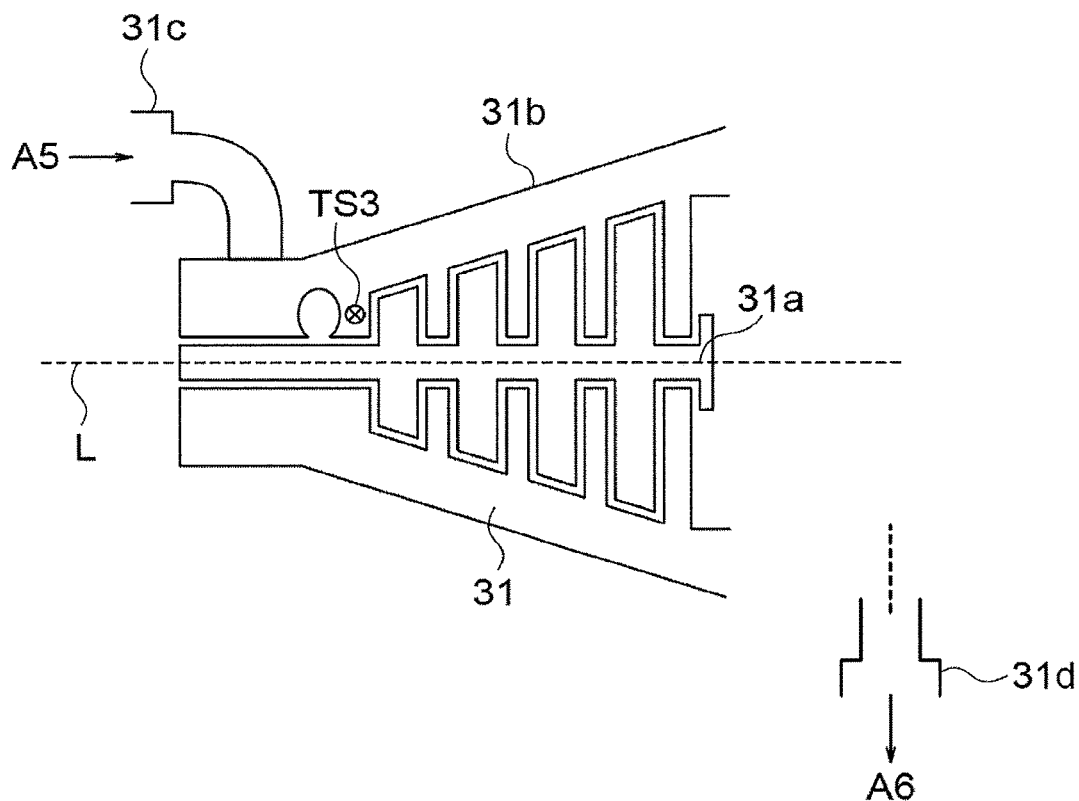
FIG. 2 is a sectional view illustrating a structure of a steam turbine of the first embodiment.

FIG. 2 is a sectional view illustrating a structure of the steam turbine 31 of the first embodiment.

The steam turbine 31 of the present embodiment includes a rotor 31a including a plurality of rotor vanes, a stator 31b including a plurality of stator vanes, a steam inlet 31c, and a steam outlet 31d. Reference sign L denotes the rotational axis of the rotor 31a. The main steam A5 is introduced through the steam inlet 31c and discharged as the main steam A6 from the steam outlet 31d through the inside of the steam turbine 31.

FIG. 2 illustrates an installation position of the temperature sensor TS3. The temperature sensor TS3 is installed near an inner surface of a first-stage stator vane of the steam turbine 31. This configuration allows the temperature sensor TS3 to detect a metal temperature at this inner surface.

Figure 3:
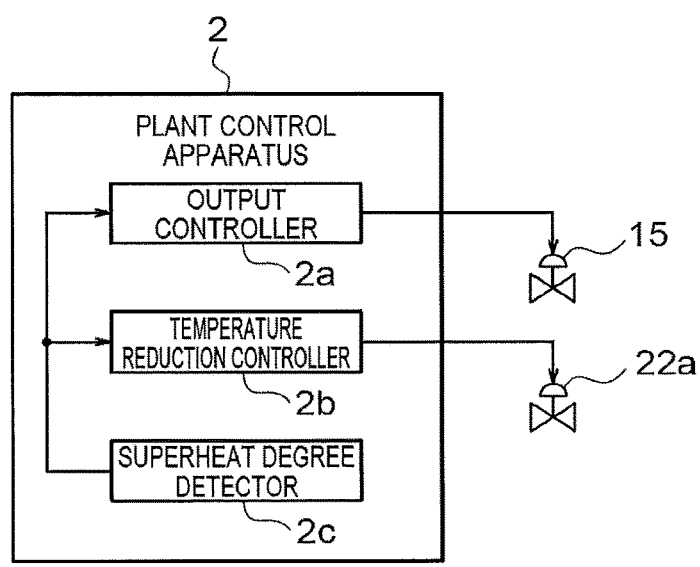
FIG. 3 is a block diagram schematically illustrating a configuration of a plant control apparatus of the first embodiment.

FIG. 3 is a block diagram schematically illustrating a configuration of the plant control apparatus 2 of the first embodiment.

The plant control apparatus 2 of the present embodiment includes an output controller 2a, a temperature reduction controller 2b and a superheat degree detector 2c.

The output controller 2a controls the output of the gas turbine 12. For example, the output controller 2a can control the output of the gas turbine 12 by adjusting the flow rate of the fuel A1 through control of the opening degree of the fuel control valve 15.

The temperature reduction controller 2b controls the steam cooling operation by the temperature reducing apparatus 22. For example, the temperature reduction controller 2b can control the cooling operation to cool the primary superheated steam A4 by the temperature reducer 22b by controlling the flow rate of the cooling water A3 through control of the opening degree of the temperature reduction control valve 22a.

The superheat degree detector 2c detects the superheat degree of the steam cooled by the temperature reducing apparatus 22. The superheat degree of steam is a difference between the temperature of the steam and the saturated temperature thereof (Superheat degree [° C.]=Temperature [° C.]−Saturated temperature [° C.]). The superheat degree is an exemplary value indicating the state of the steam. The superheat degree detector 2c of the present embodiment detects the superheat degree of the main steam A5 near the steam outlet of the exhaust heat recovery boiler 16, and outputs a result of the superheat degree detection to the output controller 2a and the temperature reduction controller 2b.

The temperature reduction controller 2b controls the cooling operation at the temperature reducing apparatus 22 while the output controller 2a controls the output of the gas turbine 12. Specifically, the temperature reduction controller 2b controls the cooling operation at the temperature reducing apparatus 22 based on the superheat degree detected by the superheat degree detector 2c. In addition, the output controller 2a controls the output of the gas turbine 12 based on the superheat degree detected by the superheat degree detector 2c.

The output controller 2a controls the output of the gas turbine 12 based on the superheat degree when the output of the gas turbine 12 is in the intermediate output range. Thus, the temperature reduction controller 2b controls the cooling operation at the temperature reducing apparatus 22 based on the superheat degree while the output controller 2a controls the output of the gas turbine 12 in the intermediate output range.

A method of detecting the superheat degree and a use method thereof will be described later in detail. The configurations and operations of the output controller 2a, the temperature reduction controller 2b, and the superheat degree detector 2c will be described later in detail.

Figure 4:
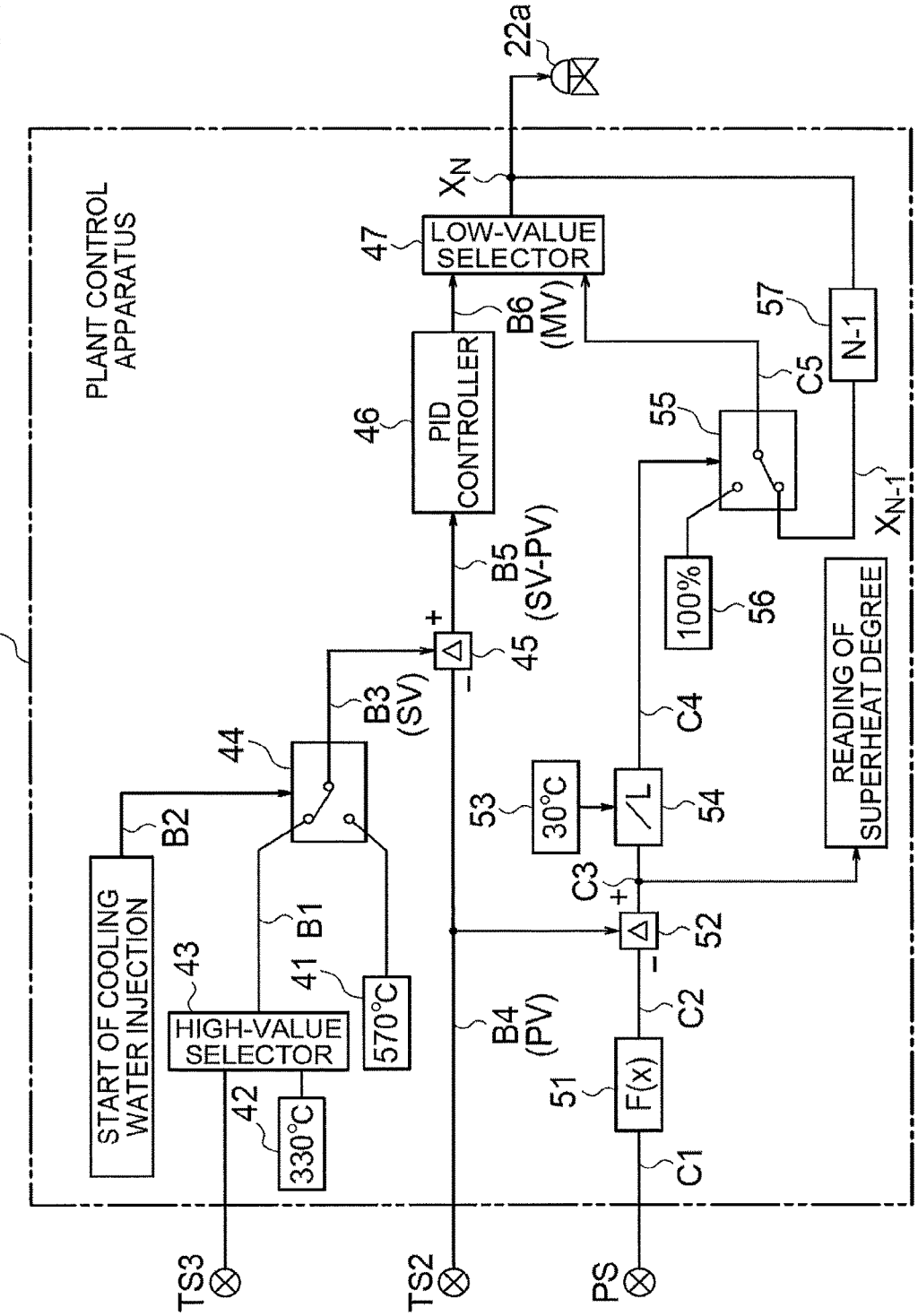
FIG. 4 is a block diagram of the configuration of the plant control apparatus of the first embodiment.

FIG. 4 is a block diagram of the configuration of the plant control apparatus 2 of the first embodiment.

As illustrated in FIG. 4, the plant control apparatus 2 includes a setter 41, a setter 42, a high-value selector 43, a switcher 44, a subtractor 45, a proportional-integral-derivative (PID) controller 46, a low-value selector 47, a function generator 51, a subtractor 52, a setter 53, a comparator 54, a switcher 55, a setter 56 and a sampling delay unit 57. The temperature reduction controller 2b and the superheat degree detector 2c of the present embodiment are each achieved by a block of these components.

The setter 41 stores therein 570° C. as a set value of the temperature of the main steam A5 (hereinafter referred to as a "main steam temperature"). This temperature is a target temperature determined based on the thermal resistance of the exhaust heat recovery boiler 16. In the present embodiment, controlling the main steam temperature to a target temperature of 570° C. can prevent damage on the exhaust heat recovery boiler 16 due to high temperature steam in the intermediate output range. When the setter 41 is used and the main steam temperature reaches 570° C., the cooling water A3 is injected into the temperature reducer 22b to reduce the main steam temperature to equal to or lower than 570° C.

When the power generating plant 1 is designed so that the temperature of the exhaust gas A2 (hereinafter referred to as an "exhaust gas temperature") in the intermediate output range has a highest temperature of 600° C. to 650° C., the main steam temperature is typically reduced to 550° C. to 600° C. approximately with taken into account the thermal resistance of the exhaust heat recovery boiler 16. Accordingly, in the present embodiment, the set value of the setter 41 is set to 570° C.

The setter 42 stores therein 330° C. as the set value of the main steam temperature. The high-value selector 43 acquires this temperature of "330° C." from the setter 42, and acquires the metal temperature at the first-stage inner surface of the steam turbine 31 (hereinafter simply referred to as a "metal temperature") from the temperature sensor TS3. Then, the high-value selector 43 selects the higher one of these temperatures and outputs the selected temperature as an activation target temperature B1. Accordingly, the activation target temperature B1 is equal to or higher than 330° C.

When the steam turbine 31 is ventilated with the main steam A5 cooled to the metal temperature, heat stress generated in the steam turbine 31 is largely reduced to put the steam turbine 31 in a state suitable for activation. However, the steam turbine 31 cannot be operated with the main steam A5 at an extremely low temperature. For this reason, the main steam temperature has a lower limit (330° C.) set to the setter 42, and the lower limit is the activation target temperature B1 when the metal temperature is lower than the lower limit.

The switcher 44 acquires the activation target temperature B1 from the high-value selector 43 and acquires a target temperature of "570° C." from the setter 41. The former target temperature is an exemplary first set value. The latter target temperature is an exemplary second set value. The switcher 44 switches the former target temperature and the latter target temperature and outputs one of the target temperatures as the set value (SV value) B3 of the main steam temperature.

The switcher 44 operates depending on a switch signal B2. The switch signal B2 is a signal for switching a method of injecting the cooling water A3. When the switch signal B2 is on, the switcher 44 switches the set value B3 to the activation target temperature B1. When the switch signal B2 is off, the switcher 44 switches the set value B3 to the target temperature of "570° C.". For example, when the power generating plant 1 of the present embodiment is activated through cold activation, the activation target temperature B1 is 330° C. In this case, when the switch signal B2 is on, the activation target temperature B1 is selected, and the SV value is 330° C. accordingly. A typical power generating plant includes the setter 41 but does not include the setter 42, the high-value selector 43, and the switcher 44. In this case, when the injection of the cooling water A3 is started, the SV value is maintained at 570° C. In this manner, at the cold activation of the present embodiment, the main steam temperature is controlled with the SV value as 330° C., which is significantly lower than 570° C.

The subtractor 45 acquires, as a process value (PV value) B4, a measured value of the main steam temperature from the temperature sensor TS2. Then, the subtractor 45 outputs a deviation B5 between the SV value B3 and the PV value B4 of the main steam temperature (deviation=SV value−PV value).

The PID controller 46 acquires the deviation B5 from the subtractor 45 and performs PID control to reduce the deviation B5 to zero. An operation amount (MV value) B6 output from the PID controller 46 is the opening degree of the temperature reduction control valve 22*a*. When the MV value B6 is changed by the PID controller 46, the opening degree of the temperature reduction control valve 22*a* is changed, and the flow rate of the cooling water A3 is changed accordingly. As a result, the PV value B4 of the main steam temperature is changed to be closer to the SV value B3.

In this manner, the PID controller 46 controls the main steam temperature by feedback control. Specifically, the PID controller 46 calculates the MV value B6 based on the deviation B5 between the SV value B3 and the PV value B4 of the main steam temperature, and controls the main steam temperature through control of the MV value B6.

However, in the present embodiment, the low-value selector 47 acquires the MV value B6 calculated by the PID controller 46 and the MV value calculated by using the superheat degree of the main steam A5. Then, the low-value selector 47 selects the lower one of these MV values and outputs the selected MV value as an opening degree command $X_N$ of the temperature reduction control valve 22*a*. The plant control apparatus 2 of the present embodiment controls the output of the gas turbine 12 based on the superheat degree of the main steam A5.

[Superheat degree of Main Steam A5]

The following describes the superheat degree of the main steam A5. The superheat degree of the main steam A5 is a difference between the temperature of the main steam A5 and the saturated temperature thereof (Superheat degree [° C.]=Temperature [° C.]−Saturated temperature [° C.]). The saturated temperature of the main steam A5 depends on the pressure of the main steam A5. The superheat degree of the main steam A5 is detected and used by, for example, the function generator 51, the subtractor 52, the setter 53, the comparator 54, the switcher 55, the setter 56, and the sampling delay unit 57 of the plant control apparatus 2 as described later.

The following first describes a case in which the SV value B3 is 570° C. When a temperature difference is assumed to be 20° C. between the exhaust gas A2 and the primary superheated steam A4 in this case, the temperature of the primary superheated steam A4 changes from 580° C. to 630° C. while the temperature of the exhaust gas A2 changes from 600° C. to 650° C. In this case, the temperature reducer 22*b* generates the main steam A5 at 570° C. by cooling the primary superheated steam A4 in a temperature range from 580° C. to 630° C. Accordingly, the primary superheated steam A4 and the main steam A5 have a small temperature difference of 10° C. to 60° C. therebetween, and thus only a small amount of the cooling water A3 needs to be injected.

The following next describes a case in which the SV value B3 is the activation target temperature B1. When a temperature difference is assumed to be 20° C. between the exhaust gas A2 and the primary superheated steam A4 in this case, the temperature of the primary superheated steam A4 is 530° C. while the temperature of the exhaust gas A2 is 550° C. In this case, when the activation target temperature B1 is 330° C., the temperature reducer 22*b* generates the main steam A5 at 330° C. by cooling the primary superheated steam A4 at 530° C. Accordingly, the primary superheated steam A4 and the main steam A5 have a large temperature difference of 200° C., and thus a large amount of the cooling water A3 needs to be injected.

In this manner, when the temperature of the primary superheated steam A4 is largely reduced, the amount of injection of the cooling water A3 becomes excessive, so that a large amount of water droplets is discharged from the temperature reducer 22*b*. These water droplets are superheated at the secondary superheater 26 but partly remain in the main steam A5. As a result, the remaining water droplets flow into the steam turbine 31 and potentially damage the steam turbine 31.

When the cooling water A3 is excessively injected even before such a state is reached, the main steam A5 having a significantly reduced superheat degree flows into the steam turbine 31 and becomes wet steam in the steam turbine 31.

This wet steam potentially damages a rotor vane or a stator vane of the steam turbine 31.

For this reason, in the power generating plant 1 of in the present embodiment, the lower limit of the superheat degree of the main steam A5 above which the steam turbine 31 is allowed to drive is determined. The plant control apparatus 2 stores therein this lower limit as a first threshold of the superheat degree of the main steam A5. The first threshold of the present embodiment is 30° C. The plant control apparatus 2 is operated to maintain the superheat degree of the main steam A5 at 30° C. or higher before and during the activation of the steam turbine 31.

Specifically, when the superheat degree of the main steam A5 becomes equal to or lower than 30° C., the plant control apparatus 2 maintains the opening degree command $X_N$ of the temperature reduction control valve 22a at a degree equal to or lower than the opening degree command $X_N$ when the superheat degree of the main steam A5 is 30° C. Accordingly, while the superheat degree of the main steam A5 is equal to or lower than 30° C., the opening degree command $X_N$ of the temperature reduction control valve 22a does not increase and the amount of injection of the cooling water A3 does not increase. As described above, the plant control apparatus 2 of the present embodiment has a function to prevent the excessive injection of the cooling water A3.

The following describes a specific circuit configuration to achieve such a function with reference to FIG. 4.

The function generator 51 acquires the pressure C1 (hereinafter referred to as "main steam pressure") of the main steam A5 from the pressure sensor PS. The function generator 51 stores therein a built-in function graph that defines a relation between the pressure of the steam and the saturated temperature thereof. Thus, the function generator 51 outputs a saturated temperature C2 corresponding to the main steam pressure C1 based on this function graph.

The function generator 51 may calculate the saturated temperature C2 from pressure other than the main steam pressure C1. Examples of such pressure include the pressure of the drum 23 and the pressure of the primary superheated steam A4. Although these pressures have a difference from the main steam pressure C1 due to a slight pressure loss, the saturated temperature C2 can be calculated from these pressures at a sufficient accuracy.

The subtractor 52 acquires the main steam temperature B4 (measured value) from the temperature sensor TS2 and acquires the saturated temperature C2 (calculated value) from the function generator 51. Then, the subtractor 52 subtracts the saturated temperature C2 from the main steam temperature B4 and outputs the superheat degree C3 of the main steam A5. This superheat degree C3 is used to control the opening degree of the temperature reduction control valve 22a, and is also read to control the output of the gas turbine 12. Control of the output of the gas turbine 12 using the superheat degree C3 will be described later.

The setter 53 stores therein 30° C. as the first threshold of the superheat degree of the main steam A5. The comparator 54 acquires the superheat degree C3 from the subtractor 52 and the first threshold from the setter 53, and compares the superheat degree C3 and the first threshold. Then, when the superheat degree C3 is higher than 30° C., the comparator 54 sets a switch signal C4 to be on. When the superheat degree C3 is equal to or lower than 30° C., the comparator 54 sets the switch signal C4 to be off.

The switcher 55 switches an opening degree command C5 of the temperature reduction control valve 22a depending on the switch signal C4. The setter 56 stores therein 100% as a set value of the opening degree command of the temperature reduction control valve 22a. The sampling delay unit 57 has a function to delay, by one period, a calculation sampling period at a central processing unit (CPU) in the plant control apparatus 2. Having received a parameter for the N-th period, the sampling delay unit 57 outputs a parameter for the (N−1)-th period at one period before the N-th period (N is an optional integer). Having acquired the opening degree command $X_N$ for the N-th period, the sampling delay unit 57 of the present embodiment outputs the opening degree command $X_{N-1}$ for the (N−1)-th period.

When the switch signal C4 is on, the switcher 55 switches the opening degree command C5 of the temperature reduction control valve 22a to 100%. Thus, having acquired the opening degree command (MV value) B6 from the PID controller 46 and the opening degree command C5 from the switcher 55, the low-value selector 47 selects and outputs the opening degree command B6 from the PID controller 46. In this manner, when the superheat degree of the main steam A5 is higher than 30° C., the opening degree command $X_N$ is controlled by PID control. When the switch signal C4 is off, the switcher 55 switches the opening degree command C5 of the temperature reduction control valve 22a to the opening degree command $X_{N-1}$ for the (N−1)-th period. Thus, having acquired the opening degree command (MV value) B6 from the PID controller 46 and the opening degree command C5 from the switcher 55, the low-value selector 47 outputs the opening degree command $X_N$ equal to or lower than the opening degree command $X_{N-1}$. This is because the opening degree command B6 is output when the opening degree command B6 is lower than the opening degree command $X_{N-1}$, and the opening degree command $X_{N-1}$ is output when the opening degree command B6 is higher than the opening degree command $X_{N-1}$. In this manner, when the superheat degree of the main steam A5 is equal to or lower than 30° C., the opening degree command $X_N$ does not increase and the amount of injection of the cooling water A3 does not increase, thereby preventing excessive injection of the cooling water A3.

As described above, the plant control apparatus 2 of the present embodiment controls the main steam temperature through the temperature reducing apparatus 22 at the activation of the power generating plant 1. However, when the main steam temperature is controlled only through the temperature reducing apparatus 22, the superheat degree C3 reaches 30° C. from a temperature of 30° C. or higher, which activates the excessive injection preventing function, and the steam turbine 31 is potentially driven at the main steam temperature that is higher than an appropriate temperature. In this case, the activation of the power generating plant 1 is potentially slow due to a large heat stress generated in the steam turbine 31.

The plant control apparatus 2 of the present embodiment controls the main steam temperature through both of control of the output of the gas turbine 12 and control of the operation of the temperature reducing apparatus 22 at the activation of the power generating plant 1. The control of the output of the gas turbine 12 is performed by the output controller 2a, and the control of the operation of the temperature reducing apparatus 22 is performed by the temperature reduction controller 2b (refer to FIG. 3). The following describes such control in detail with reference to FIG. 5.

Figure 5:
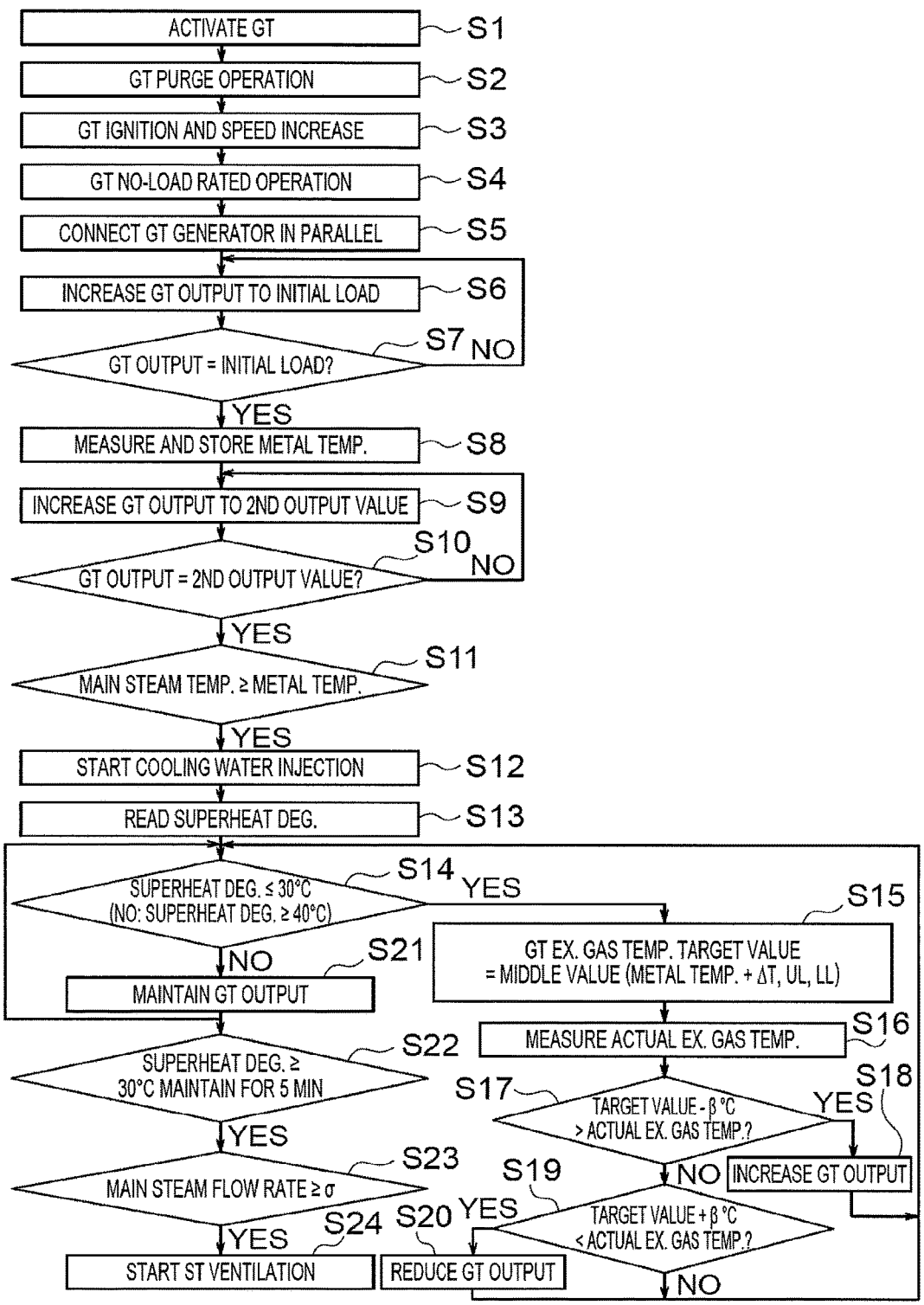
FIG. 5 is a flowchart of a plant control method of the first embodiment.

FIG. 5 is a flowchart of a plant control method of the first embodiment. The plant control method in FIG. 5 is executed by the plant control apparatus 2 at the activation of the power generating plant 1.

When the gas turbine 12 is activated (step S1), a purge operation of the gas turbine 12 is performed (step S2). In the purge operation, air is flowed into the gas turbine 12 to discharge the fuel A1 accumulated in the gas turbine 12. Next, the gas turbine 12 is ignited and the speed thereof is increased (step S3), so that the gas turbine 12 reaches a no-load rated operation (step S4).

Next, the GT generator 13 is connected in parallel (step S5), and then the plant control apparatus 2 acquires a measured value of the metal temperature from the temperature sensor TS3 and stores therein the measured value (step S8). Right after the GT generator 13 is connected in parallel, the plant control apparatus 2 increases the output of the gas turbine 12 at steps to the initial load to avoid disturbance of reverse power (steps S6 and S7).

After the gas turbine 12 reaches the initial load, processing at steps S9 and S10 is performed to facilitate rapid increase of the main steam temperature. Specifically, the output of the gas turbine 12 is increased so that the output value of the gas turbine 12 reaches a second output value higher than a first output value (steps S9 and S10). The first output value is an output value for adjusting the exhaust gas temperature to a predetermined temperature based on the metal temperature.

After the gas turbine 12 reaches the second output value, the output value of the gas turbine 12 is maintained at the second output value. While the output value is maintained at the second output value, the exhaust heat recovery boiler 16 can receive a large amount of the exhaust gas A2 at high temperature and perform active heat recovery. Accordingly, the temperature and the flow rate of the primary superheated steam A4 are increased fast and thus the main steam temperature is increased fast.

Next, when the main steam temperature reaches the metal temperature (step S11), the switch signal B2 in FIG. 4 switches from off to on. As a result, the SV value B3 of the main steam temperature switches to the activation target temperature B1, and the injection of the cooling water A3 is started to control the main steam temperature based on the metal temperature (step S12).

Then, the plant control apparatus 2 reads, for the control of the output of the gas turbine 12, the superheat degree C3 calculated for the control of the operation of the temperature reducing apparatus 22 (step S13). The temperature and the flow rate of the primary superheated steam A4 continuously increase still after the processing at step S13. To deal with this, the plant control apparatus 2 opens the temperature reduction control valve 22a to gradually increase the flow rate of the cooling water A3. The superheat degree C3 gradually decreases as the increase of the flow rate of the cooling water A3.

["YES" at Step S14]

Next, the plant control apparatus 2 performs flag determination of the superheat degree C3 to determine whether the superheat degree C3 has decreased to the first threshold (30° C.) (step S14). When the superheat degree C3 is equal to or lower than 30° C., the process proceeds to matching processing of the main steam temperature at steps S15 to S20. This starts processing of reducing the output value of the gas turbine 12 from the second output value toward the first output value.

When the superheat degree C3 is equal to or lower than 30° C., drive of the steam turbine 31 is not allowed, and thus the function to prevent the excessive injection of the cooling water A3 at the plant control apparatus 2 is activated to stop increase of the amount of injection of the cooling water A3. In other words, the steam turbine 31 reaches an operational limiting point. Meanwhile, the temperature and the flow rate of the primary superheated steam A4 continue increasing.

Accordingly, the temperature and the flow rate of the primary superheated steam A4 continuously increase, so that the main steam temperature increases to a temperature higher than the metal temperature eventually.

Thus, when the superheat degree C3 is equal to or lower than 30° C., the plant control apparatus 2 of the present embodiment does not increase the amount of injection of the cooling water A3 but gradually reduces the output value of the gas turbine 12 from the second output value toward the first output value (steps S15 to S20). In other words, when the steam turbine 31 reaches the operational limiting point, processing to reduce the output of the gas turbine 12 is started though the matching processing of the main steam temperature. Accordingly, the temperature and the flow rate of the primary superheated steam A4 can be reduced to reduce a load on the cooling operation at the temperature reducing apparatus 22.

The following describes steps S15 to S20 in detail.

First, a target value of the exhaust gas temperature (the temperature of the exhaust gas A2) is calculated by using the metal temperature stored at step S8 (step S15). The target value of the exhaust gas temperature of the present embodiment is the metal temperature+$\Delta T$. $\Delta T$ is a value assumed to be a temperature difference between the exhaust gas temperature and the main steam temperature. $\Delta T$ of the present embodiment is set to 30° C. However, at step S15 of the present embodiment, the target value of the exhaust gas temperature is limited by a lower limit (LL value) and an upper limit (UL value). Specifically, the target value of the exhaust gas temperature is set to be a middle value of the metal temperature+$\Delta T$, the LL value, and the UL value.

Next, the actual exhaust gas temperature is measured at this stage (step S16). Specifically, a measured value of the exhaust gas temperature is acquired from the temperature sensor TS1. Next, the target value−$\beta$ ($\beta$ is a predetermined value) is compared with the actual exhaust gas temperature (step S17). If the target value−$\beta$ is higher than the actual exhaust gas temperature, the output of the gas turbine 12 is gradually increased (step S18) and the process returns to step S14. If the target value−$\beta$ is lower than the actual exhaust gas temperature, the process proceeds to step S19.

Next, the target value+$\beta$ is compared with the actual exhaust gas temperature (step S19). If the target value+$\beta$ is lower than the actual exhaust gas temperature, the output of the gas turbine 12 is gradually reduced (step S20), and the process returns to step S14. If the target value+$\beta$ is higher than the actual exhaust gas temperature, the output of the gas turbine 12 is not changed, and the process returns to step S14.

$\beta$ is a constant for defining an allowable deviation range of the actual exhaust gas temperature. At steps S15 to S20, the output of the gas turbine 12 is controlled to control the actual exhaust gas temperature in the range of the target value±$\beta$. In this control, since the actual exhaust gas temperature at the second output value is higher than the target value, the output of the gas turbine 12 is gradually reduced through repetition of the processing at steps S15 to S20. Accordingly, the output value of the gas turbine 12 is gradually reduced from the second output value toward the first output value.

[No at Step S14]

When the matching processing at steps S15 to S20 ends, the process illustrated in FIG. 5 returns to the flag determination at step S14 whether or not the gas turbine 12 has reached the first output value. When the output of the gas turbine 12 has decreased through the matching processing, the exhaust gas temperature has decreased as well, and the temperature and the flow rate of the primary superheated steam A4, which were increasing, have started decreasing. Thus, the plant control apparatus 2 can maintain the main steam temperature at the metal temperature even when the flow rate of the cooling water A3 is reduced. The superheat degree C3 gradually increases along with the reduction in the flow rate of the cooling water A3.

When the superheat degree C3 is 30° C. to 40° C., the control of the output of the gas turbine 12 at the matching processing is continued (step S14). Since the target value+β is usually lower than the actual exhaust gas temperature, the output of the gas turbine 12 is continuously reduced similarly to step S20. The temperature of 40° C. is a second threshold of the superheat degree C3, and set to be higher than the first threshold. Similarly to the first threshold, the second threshold is set in the plant control apparatus 2.

The flag determination at step S14 determines whether the superheat degree C3 has increased to the second threshold (40° C.). When the superheat degree C3 is equal to or higher than 40° C., the processing of reducing the output value of the gas turbine 12 from the second output value toward the first output value is stopped. Then, while the superheat degree C3 is equal to or higher than 40° C., the plant control apparatus 2 controls the output of the gas turbine 12 to maintain the output value of the gas turbine 12 when the superheat degree C3 is 40° C. (step S21).

The flag determination at step S14 is performed based on the two thresholds of the first threshold (30° C.) and the second threshold (40° C.). Thus, the flag determination has such a differential that "YES" is provided at a temperature equal to or lower than 30° C., and "NO" is provided at a temperature equal to or higher than 40° C. If the differential is set to zero by setting the first threshold and the second threshold to an identical value, the "YES" determination and the "NO" determination are frequently repeated in a short time, which potentially causes an unstable operation of the power generating plant 1. In order to avoid this unstable operation, the differential of the present embodiment is set to be non-zero (10° C.).

["YES" at Step S14]

After step S21, the process illustrated FIG. 5 returns to the flag determination at step S14. Although the output of the gas turbine 12 is maintained constant, the temperature and the flow rate of the primary superheated steam A4 increase as time elapses thereafter. To deal with this, the plant control apparatus 2 maintains the main steam temperature at the metal temperature by increasing the flow rate of the cooling water A3. The superheat degree C3 gradually decreases again along with the increase of the flow rate of the cooling water A3.

When the superheat degree C3 is 30° C. to 40° C., the control of the output of the gas turbine 12 at step S21 is continued (step S14). In other words, the output of the gas turbine 12 is maintained constant.

Then, when the superheat degree C3 is equal to or lower than 30° C., the plant control apparatus 2 of the present embodiment does not increase the amount of injection of the cooling water A3 but resumes the processing of reducing the output value of the gas turbine 12 from the second output value toward the first output value (steps S15 to S20). Accordingly, the output value of the gas turbine 12 is gradually reduced from the maintained value toward the first output value.

In this manner, the plant control apparatus 2 of the present embodiment alternately repeats first processing of reducing the output value of the gas turbine 12 from the second output value toward the first output value, and second processing of maintaining the output value of the gas turbine 12 constant while interrupting the first processing. When the superheat degree C3 has decreased to 30° C. (the first threshold), the first processing is started. Thereafter, when the superheat degree C3 has increased to 40° C. (the second threshold), the first processing is stopped and the second processing is started. Then, when the superheat degree C3 has decreased to 30° C. (the first threshold) again, the second processing is stopped and the first processing is started again. Thereafter, when the superheat degree C3 has increased to 40° C. (the second threshold) again, the first processing is stopped and the second processing is started again.

After the repetition of the first processing and the second processing a plurality of times, the superheat degree C3 is not reduced to 30° C. or lower for a long time after the output of the gas turbine 12 is maintained at a certain value at step S21. This is because the thermal equilibrium of a combined cycle has left a transient state and reached a stable state. When the output of the gas turbine 12 has reached the value, for example, the exhaust gas temperature, the temperature and the flow rate of the primary superheated steam A4, the flow rate of the cooling water, and the superheat degree C3 are balanced. As a result, the main steam temperature can be maintained at the metal temperature while the superheat degree C3 is maintained at 30° C. or higher.

When the superheat degree C3 has been equal to or higher than 30° C. for five minutes, the plant control apparatus 2 determines that the thermal equilibrium of the combined cycle has reached the stable state (step S22). When the thermal equilibrium has reached the stable state, the plant control apparatus 2 checks whether the flow rate of the main steam has reached a value σ necessary for performing the FSNL operation of the steam turbine 31 (step S23). If the flow rate of the main steam has reached the value σ, the plant control apparatus 2 starts the ventilation of the steam turbine 31, in other words, the activation of the steam turbine 31 (step S24).

As described above, at step S14 or the following steps, the plant control method illustrated in FIG. 5 alternately repeats the first processing of reducing the output value of the gas turbine 12 from the second output value toward the first output value, and the second processing of maintaining the output value of the gas turbine 12 constant while interrupting the first processing. While the first and second processing is executed, the plant control apparatus 2 of the present embodiment controls not only the output of the gas turbine 12 but also the cooling operation at the temperature reducing apparatus 22. In other words, the plant control apparatus 2 of the present embodiment controls the main steam temperature through both of the control of the output of the gas turbine 12 and the control of the operation of the temperature reducing apparatus 22.

Thus, according to the present embodiment, it is possible to suppress excessive increase of the main steam temperature and excessive reduction of the flow rate of the main steam at step S14 or the following steps. This effect will be described later in detail.

Figure 6:
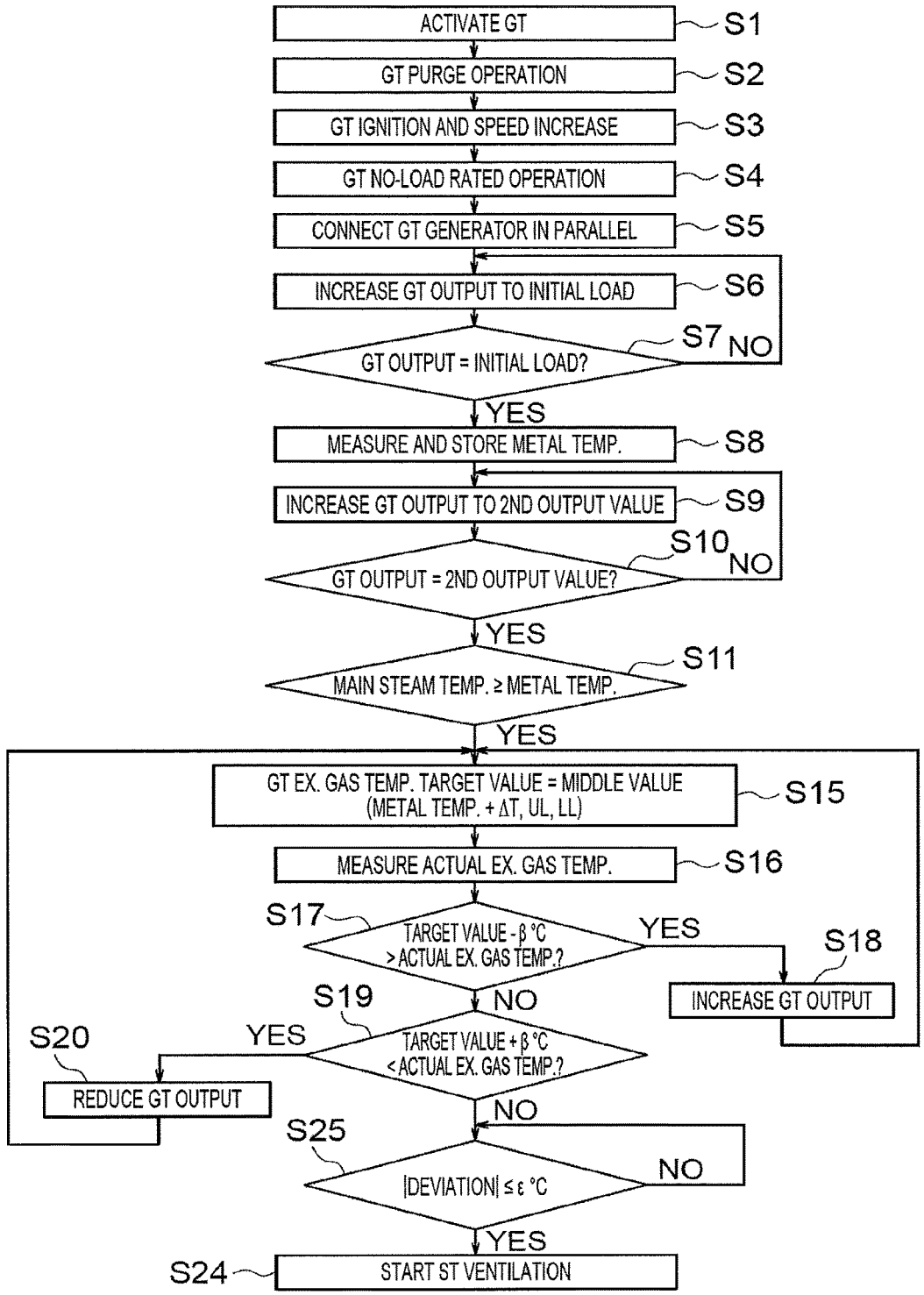
FIG. 6 is a flowchart of a plant control method of a comparative example of the first embodiment.

FIG. 6 is a flowchart of a plant control method of a comparative example of the first embodiment.

Steps S1 to S11 of the comparative example illustrated in FIG. 6 are performed in a manner similar to the plant control method illustrated in FIG. 5. However, in the present comparative example, the matching processing at steps S14 to S20 is performed without executing step S12 (start of the injection of the cooling water) and step S13 (reading of the superheat degree). The output value of the gas turbine 12 of the present comparative example is gradually reduced from the second output value to the first output value through the repetition of the matching processing. Then, when the absolute value of a deviation between the main steam temperature and the metal temperature is equal to or smaller than e (step S25), the ventilation of the steam turbine 31 is started (step S24).

Any difference of effect between the process of the first embodiment illustrated in FIG. 5 and the process of the comparative example illustrated in FIG. 6 will be described later.

Figure 7:
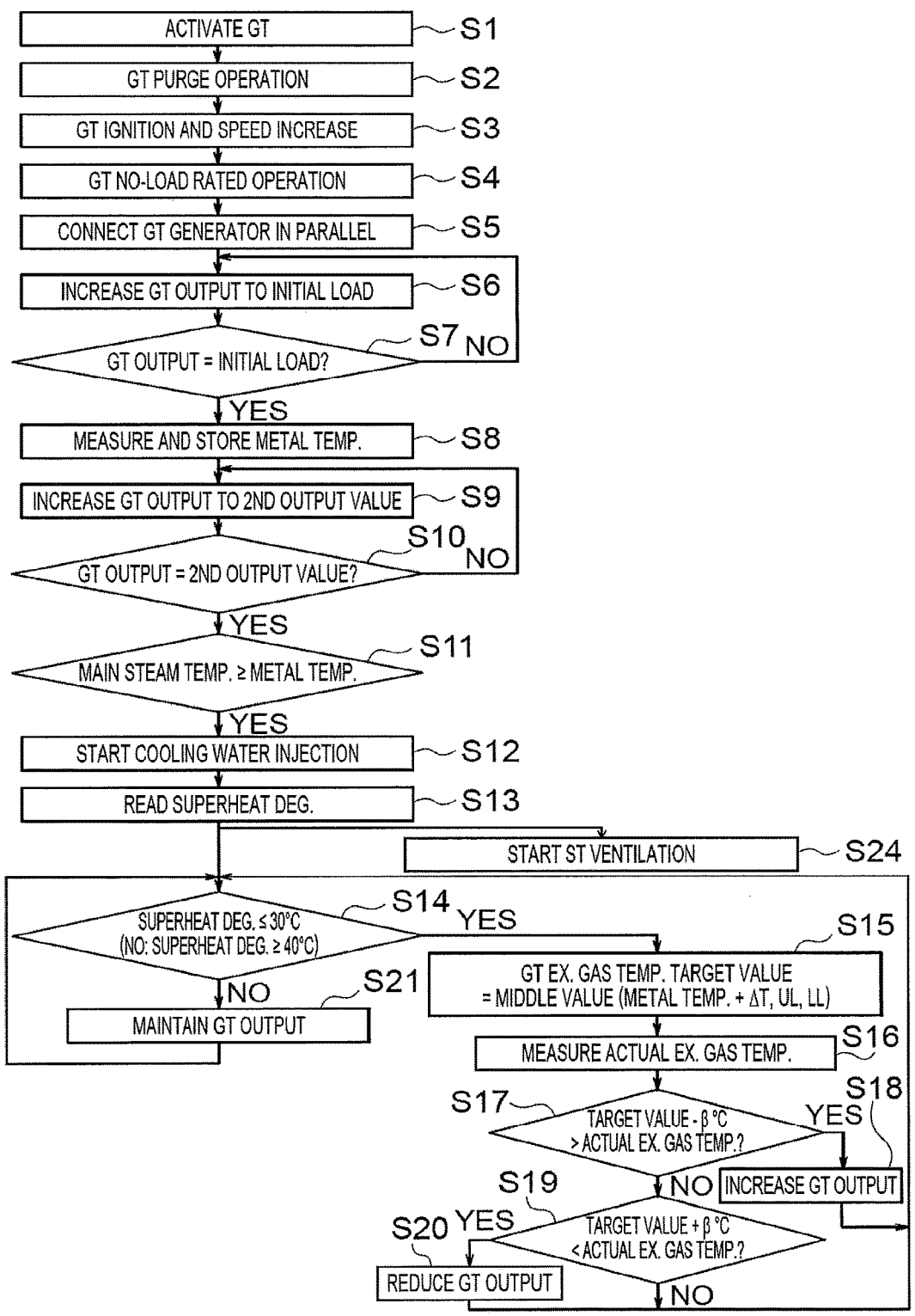
FIG. 7 is a flowchart of a plant control method of a modification of the first embodiment.

FIG. 7 is a flowchart of a plant control method of a modification of the first embodiment.

In the process illustrated in FIG. 5, the ventilation of the steam turbine 31 is started after the thermal equilibrium of the combined cycle has reached the stable state (steps S22 to S24). When the power generating plant 1 is desired to be activated fast, however, the ventilation of the steam turbine 31 may be started at an earlier stage.

In the process of the modification illustrated in FIG. 7, the ventilation of the steam turbine 31 is started right after the processing at step S12 (start of the injection of the cooling water) and step S13 (reading of the superheat degree) (step S24). This is because the main steam temperature has already reached the metal temperature at step S11.

However, the balance to be reached when the thermal equilibrium of the combined cycle has reached the stable state later is unclear at step S13. Thus, in the present modification, it is not guaranteed whether the flow rate of the main steam becomes equal to or larger than the value σ necessary for performing the FSNL operation of the steam turbine 31.

Consideration of these advantages and disadvantages indicates that the process of the first embodiment illustrated in FIG. 5 has a high operational reliability, and thus is more suitable for a biaxial combined cycle. On the other hand, the process of the modification illustrated in FIG. 7 can achieve the fast activation, and thus is more suitable for a uniaxial combined cycle.

Figure 8:
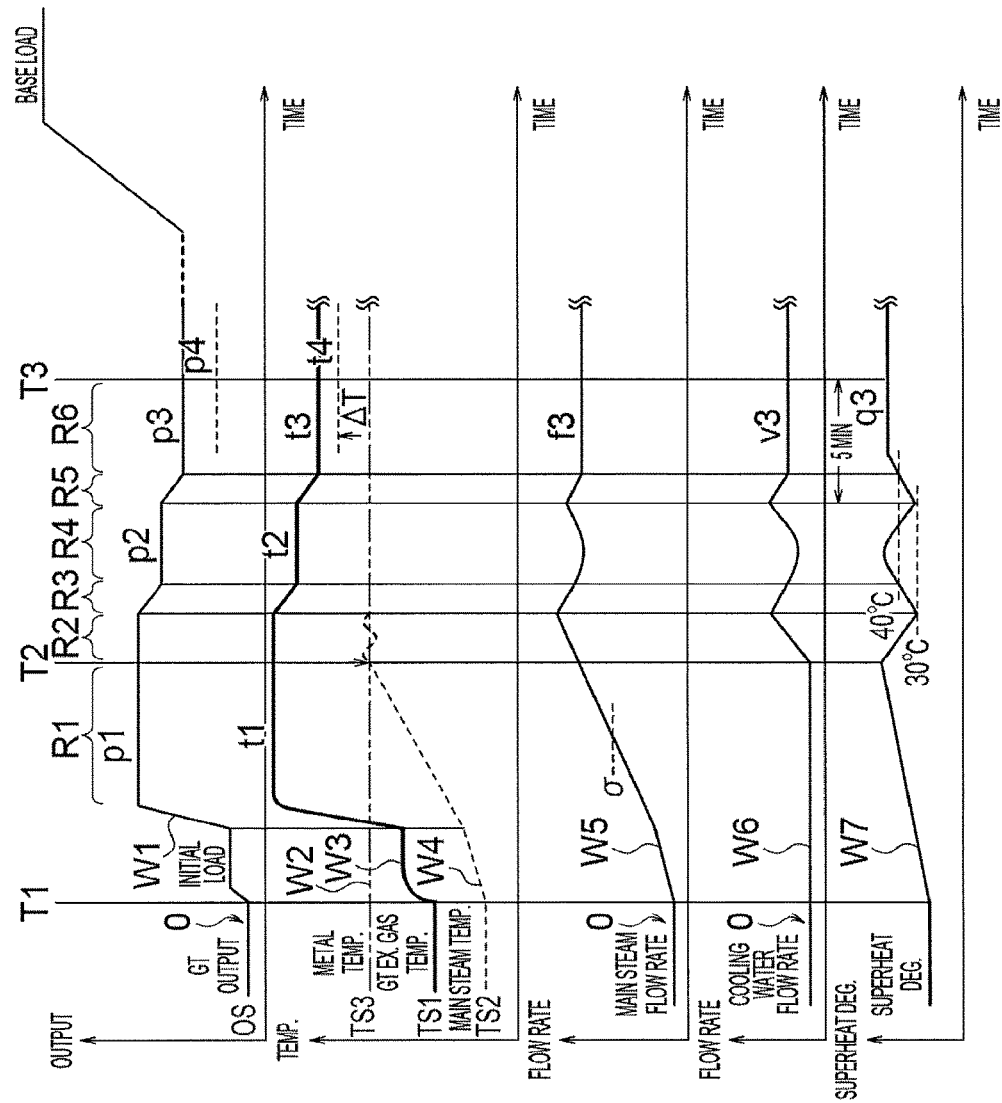
FIG. 8 is a graph for describing the plant control method of the first embodiment.

FIG. 8 is a graph for describing the plant control method of the first embodiment. The execution of the plant control method illustrated in FIG. 8 follows the process illustrated in FIG. 5 by the plant control apparatus 2 at the activation of the power generating plant 1.

As illustrated by waveform W1, the output of the gas turbine 12 starts increasing from zero at time T1, increases to the initial load, and then increases to a second output value p1. Accordingly, as illustrated by waveform W3, the exhaust gas temperature increases to an exhaust gas temperature t1 that is a high temperature. The exhaust heat recovery boiler 16 recovers heat of the exhaust gas A2 at the temperature t1 and generates the main steam A5. Accordingly, as illustrated by waveform W5, the flow rate of the main steam increases fast, and continuously increases after having reached the value σ necessary for performing the FSNL operation of the steam turbine 31. Waveform W4 representing the main steam temperature rapidly increases to be closer to waveform W2 representing the metal temperature. These pieces of processing are performed in duration R1. When the main steam temperature (waveform W4) has reached the metal temperature (waveform W2) at time T2, the injection of the cooling water A3 at step S12 is started and waveform W6 representing the flow rate of the cooling water starts increasing. Since the flow rate of the main steam (waveform W5) and the temperature of the primary superheated steam A4 continuously increase as time elapses, waveform W6 representing the flow rate of the cooling water continuously increases. Simultaneously, waveform W7 representing the superheat degree of the main steam A5 continuously decreases. These pieces of processing are performed in duration R2.

When waveform W7 representing the superheat degree has decreased to 30° C. (the first threshold), waveform W1 representing the output of the gas turbine 12 starts decreasing from the second output value p1 toward the first output value p4. Simultaneously, waveform W3 representing the exhaust gas temperature decreases. Thus, the amount of heat recovery by the exhaust heat recovery boiler 16 decreases, and the flow rate of the main steam (waveform W5) and the temperature of the primary superheated steam A4 decrease. As a result, waveform W6 representing the flow rate of the cooling water decreases, and waveform W7 representing the superheat degree starts increasing. These pieces of processing are performed in duration R3. The control of the output of the gas turbine 12 in duration R3 corresponds to the above-described first processing.

When waveform W7 representing the superheat degree has increased to 40° C. (the second threshold), waveform W1 representing the output of the gas turbine 12 stops decreasing toward the first output value p4 and maintains at an output value p2 at 40° C. The output value p2 is lower than the first output value p1 and higher than the second output value p4. Waveform W3 representing the exhaust gas temperature is maintained at a temperature t2 lower than the temperature t1. During an operation at the temperature t2, the amount of heat recovery by the exhaust heat recovery boiler 16 temporarily decreases, and the flow rate of the main steam (waveform W5) and the temperature of the primary superheated steam A4 temporarily decrease. However, the flow rate of the main steam (waveform W5) and the temperature of the primary superheated steam start increasing again as time elapses. As a result, waveform W6 representing the flow rate of the cooling water starts increasing, and waveform W7 representing the superheat degree starts decreasing. These pieces of processing are performed in duration R4. The control of the output of the gas turbine 12 in duration R4 corresponds to the above-described second processing.

When waveform W7 representing the superheat degree has decreased to 30° C. (the first threshold) again, waveform W1 representing the output of the gas turbine 12 starts decreasing toward the first output value p4 again. Simultaneously, waveform W3 representing the exhaust gas temperature decreases. Accordingly, the amount of heat recovery by the exhaust heat recovery boiler 16 decreases, and the flow rate of the main steam (waveform W5) and the temperature of the primary superheated steam A4 decrease. As a result, waveform W6 representing the flow rate of the cooling water decreases, and waveform W7 representing the superheat degree starts increasing. These pieces of processing are performed in duration R5. The control of the output of the gas turbine 12 in duration R5 corresponds to the above-described first processing.

When waveform W7 representing the superheat degree has increased to 40° C. (the second threshold) again, waveform W1 representing the output of the gas turbine 12 stops decreasing toward the first output value and maintains at an output value p3 at 40° C. The output value p3 is lower than the output value p2 and higher than the second output value p4. Waveform W3 representing the exhaust gas temperature is maintained at a temperature t3 lower than the temperature t2. During an operation at the temperature t3, the exhaust gas the temperature t3, the flow rate of the main steam f3, the flow rate of the cooling water v3, the superheat degree q3, and the temperature of the primary superheated steam (not illustrated) are balanced. As a result, the main steam temperature can be maintained at the metal temperature while the superheat degree is maintained at 30° C. or higher. The output value p3 for achieving such a state is obtained by the plant control method describe so far. These pieces of processing are performed in duration R6. The control of the output of the gas turbine 12 in duration R6 corresponds to the above-described second processing.

When the superheat degree C3 has been continuously equal to or higher than 30° C. for five minutes (time T3), the ventilation of the steam turbine 31 is started. In the process illustrated in FIG. 8, the first and second processing is repeated twice, but may be repeated three times or more.

FIG. 9 is a graph for describing the plant control method of the comparative example of the first embodiment. The execution of the plant control method illustrated in FIG. 9 follows the process illustrated in FIG. 6.

In FIG. 8, when the main steam temperature (waveform W4) has reached the metal temperature (waveform W2) at time T2, the injection of the cooling water A3 at step S12 is started (duration R2). Then, the first processing and the second processing are alternately repeated, so that waveform W1 representing the output of the gas turbine 12 gradually decreases from the second output value p1 toward the first output value p4 (duration R3 to R6).

In FIG. 9, however, when the main steam temperature (waveform W4) has reached the metal temperature (waveform W2) at time T2, waveform W1 representing the output of the gas turbine 12 is reduced from the second output value p1 to the first output value p4 without starting the injection of the cooling water A3 at step S12 (duration R7).

In the comparative example illustrated in FIG. 9, the control of the main steam temperature is performed through the control of the output of the gas turbine 12, and thus the output of the gas turbine 12 needs to be reduced to the first output value p4. Accordingly, the exhaust gas temperature decreases to a temperature t4 (=the metal temperature+ΔT). As a result, the amount of heat held by the exhaust gas A2 decreases, and the flow rate of the main steam decreases to f4. However, when this flow rate f4 of the main steam is lower than the value σ necessary for performing the FSNL operation of the steam turbine 31, the speed of the steam turbine 31, which has been increasing for the FSNL operation, adversely starts decreasing. In FIG. 9, the flow rate of the main steam has decreased to the value σ at a time indicated by reference sign Z.

In the present embodiment illustrated in FIG. 8, however, the control of the main steam temperature is performed through the control of the output of the gas turbine 12 and the control of the operation of the temperature reducing apparatus 22, and thus the output of the gas turbine 12 does not need to be reduced to the first output value p4. In FIG. 9, the output of the gas turbine 12 has been reduced to p3 (>p4), and the flow rate of the main steam has been reduced to f3 (>σ>f4). Thus, according to the embodiment illustrated in FIG. 8, the FSNL operation of the steam turbine 31 can be performed without any problem.

As described above, in the present embodiment, the main steam temperature is controlled through both of the control of the output of the gas turbine 12 and the control of the operation of the temperature reducing apparatus 22. For example, in the present embodiment, the exhaust gas temperature is roughly reduced through the control of the output of the gas turbine 12, and the main steam temperature is controlled roughly accordingly, and then finely controlled through the control of the operation of the temperature reducing apparatus 22.

In evaluation of the present embodiment about the control of the output of the gas turbine 12, the use of both of the control of the output of the gas turbine 12 and the control of the operation of the temperature reducing apparatus 22 has the following advantage. When the temperature reducing apparatus 22 injects the cooling water A3, the control of the main steam temperature through the control of the output of the gas turbine 12 is assisted accordingly. This achieves a higher exhaust gas temperature, in other words, higher gas turbine output. Accordingly, this reduces the amount of reduction in the gas turbine output for decreasing the main steam temperature. Alternatively, this eliminates the need to reduce the gas turbine output to reduce the main steam temperature. Thus, the present embodiment can solve or reduce the problem that the generated amount of the main steam excessively decreases, for example, at the activation of the power generating plant 1.

In evaluation of the present embodiment about the control of the operation of the temperature reducing apparatus 22, the use of both of the operation of the temperature reducing apparatus 22 and the control of the output of the gas turbine 12 has the following advantage. When the output of the gas turbine 12 is controlled to decrease from the second output value toward the first output value, the temperature of the primary superheated steam A4 decreases, which reduces a load on the temperature reducing apparatus 22 when cooling the primary superheated steam A4. Thus, the present embodiment can achieve a target main steam temperature by using such a relatively small amount of the cooling water that the superheat degree can be maintained at 30° C. or higher.

In the present embodiment, the gas turbine output and the flow rate of the cooling water are controlled based on the superheat degree of the main steam A5. In the present embodiment, the gas turbine output and the flow rate of the cooling water are controlled with reference to the first threshold (30° C.) and the second threshold (40° C.) of the superheat degree. Thus, the present embodiment can suppress excessive reduction of the gas turbine output, and accordingly suppress excessive reduction of the flow rate of the main steam.

In a comparison of the first embodiment illustrated in FIG. 8 and the comparative example illustrated in FIG. 9, a time required until start of the ventilation of the steam turbine 31 is typically shorter in the comparative example. However, the present embodiment can activate the power generating plant 1 while suppressing excessive increase of the main steam temperature and excessive reduction of the flow rate of the main steam.

While certain embodiments have been described, these embodiments have been presented by way of example only, and are not intended to limit the scope of the inventions. Indeed, the novel apparatuses, methods and plants described herein may be embodied in a variety of other forms; furthermore, various omissions, substitutions and changes in the form of the apparatuses, methods and plants described herein may be made without departing from the spirit of the inventions. The accompanying claims and their equivalents are intended to cover such forms or modifications as would fall within the scope and spirit of the inventions.

The invention claimed is:

1. A plant control apparatus configured to control a power generating plant comprising:
   a gas turbine configured to be driven by a gas;
   an exhaust heat recovery boiler configured to generate steam by using heat of an exhaust gas from the gas turbine;

a temperature reducing apparatus configured to cool, through a cooling medium from a reduction control valve, the steam generated by the exhaust heat recovery boiler; and a steam turbine configured to be driven by the steam cooled by the temperature reducing apparatus, the plant control apparatus comprising:

an output controller configured to control output of the gas turbine based on a value representing a state of the steam;

a temperature reduction controller configured to control a cooling operation of the steam by the temperature reducing apparatus based on the value representing the state of the steam while the output controller controls the output of the gas turbine; and a superheat degree detector configured to detect a superheat degree of the steam cooled by the temperature reducing apparatus, wherein the value representing the state of the steam is the superheat degree detected by the superheat degree detector.

2. The plant control apparatus of claim 1, wherein the temperature reduction controller controls the cooling operation of the steam by the temperature reducing apparatus while the output controller reduces an output value of the gas turbine from a second output value toward a first output value.

3. The plant control apparatus of claim 2, wherein the first output value is determined based on a temperature of the exhaust gas and a metal temperature of the steam turbine.

4. The plant control apparatus of Claim 1, wherein the output controller starts reducing the output of the gas turbine when the superheat degree has decreased to a first threshold.

5. The plant control apparatus of claim 4, wherein the first threshold is a lower limit of the superheat degree that allows drive of the steam turbine.

6. The plant control apparatus of claim 4, wherein the output controller stops reducing the output of the gas turbine when the superheat degree has increased to a second threshold higher than the first threshold.

7. The plant control apparatus of claim 6, wherein the output controller controls, while the superheat degree is higher than the second threshold, the output of the gas turbine to maintain at the output value of the gas turbine when the superheat degree reaches the second threshold.

8. The plant control apparatus of claim 1, wherein the temperature reduction controller includes a switching module configured to switch a set value of the temperature of the steam between a first set value determined based on a metal temperature of the steam turbine and a second set value different from the first set value.

9. A plant control method of controlling a power generating plant comprising:

a gas turbine configured to driven by a gas;

an exhaust heat recovery boiler configured to generate steam by using heat of an exhaust gas from the gas turbine;

a temperature reducing apparatus configured to cool, through a cooling medium from a reduction control valve, the steam generated by the exhaust heat recovery boiler;

a steam turbine configured to be driven by the steam cooled by the temperature reducing apparatus, the method comprising:

controlling, by an output controller, output of the gas turbine based on a value representing a state of the steam; and controlling, by a temperature reduction controller, a cooling operation of the steam by the temperature reducing apparatus based on the value representing the state of the steam while the output controller controls the output of the gas turbine; and detecting, by a superheat degree detector, a superheat degree of the steam cooled by the temperature reducing apparatus, wherein the value representing the state of the steam is the superheat degree detected by the superheat degree detector.

10. A power generating plant comprising:

a gas turbine configured to be driven by a gas;

an exhaust heat recovery boiler configured to generate steam by using heat of an exhaust gas from the gas turbine;

a temperature reducing apparatus configured to cool, through a cooling medium from a reduction control valve, the steam generated by the exhaust heat recovery boiler;

a steam turbine configured to be driven by the steam cooled by the temperature reducing apparatus;

an output controller configured to control output of the gas turbine based on a value representing a state of the steam;

a temperature reduction controller configured to control a cooling operation of the steam by the temperature reducing apparatus based on the value representing the state of the steam while the output controller controls the output of the gas turbine; and a superheat degree detector configured to detect a superheat degree of the steam cooled by the temperature reducing apparatus, wherein the value representing the state of the steam is the superheat degree detected by the superheat degree detector.

* * * * *